United States Patent
Song

(10) Patent No.: US 8,674,029 B2
(45) Date of Patent: Mar. 18, 2014

(54) METHOD OF PREPARING STABILIZED POLYMERIC SYSTEMS USING POLYMERIC PEROXIDES

(75) Inventor: Chengqian Song, Green Brook, NJ (US)

(73) Assignee: Sunocs LLC, Valparaiso, IN (US)

( * ) Notice: Subject to any disclaimer, the term of this patent is extended or adjusted under 35 U.S.C. 154(b) by 468 days.

(21) Appl. No.: 12/851,552

(22) Filed: Aug. 6, 2010

(65) Prior Publication Data

US 2012/0035315 A1    Feb. 9, 2012

(51) Int. Cl.
*C08F 210/16* (2006.01)

(52) U.S. Cl.
USPC .................. 525/331.7; 525/331.9; 525/333.7; 525/333.8; 525/374

(58) Field of Classification Search
USPC .............. 525/331.7, 331.9, 333.7, 333.8, 374
See application file for complete search history.

(56) References Cited

U.S. PATENT DOCUMENTS

2006/0160954 A1* 7/2006 Dang et al. .................... 525/242

* cited by examiner

*Primary Examiner* — Edward Cain
(74) *Attorney, Agent, or Firm* — Cheng Q. Song

(57) ABSTRACT

The present invention generally relates to a process for preparing stabilized polymeric systems with excellent light, thermal and oxidation stability using an active, peroxide containing polymer oxidizing agents, amine-containing reducing agents, and/or nano-additives, and the polymer articles made therefrom.

5 Claims, No Drawings

METHOD OF PREPARING STABILIZED POLYMERIC SYSTEMS USING POLYMERIC PEROXIDES

TECHNICAL FIELD

The present invention generally relates to a method of preparing stabilized polymeric systems with excellent light, thermal and oxidation stability using a formulation containing reactive, polymeric peroxides, amine-containing reducing agents, and/or nano-additives, and the polymer articles made therefrom.

BACKGROUND

It is known that most polymer materials need to have a stabilization system in order to achieve satisfactory performance in their thermal, light, and oxidation stability. The additives are normally added to the polymer materials during melt processing, such as screw extrusion, injection molding, casting, blow molding, etc. The efficiency of these additives is not only a function of the additives themselves but also a function of the distribution of such additives in the polymer matrix. For example, U.S. Patent Application U2006/0155027 disclosed a composition in which reactive flame retardants are chemically bonded to the polymeric matrix so that the resulting polymer has a better flame retardancy and less blooming due to the fact that the functional groups are grafted on to the polymeric material matrix.

The additives can be chemically bound to the polymeric materials via grafting of functional additives by various methods known in the state of the art, such as by grafting reaction which may be conducted in polymer solutions, in the presence of solid polymer or with a polymer in molten state. The active sites on the polymers can be formed either in the presence of grafting additives, or be contacted with the functional additives at a later stage. The grafting sites can be produced by treatment with a peroxide or any other chemical compound which is a free radical polymerization initiator capable of extracting a hydrogen free radical from the polymer backbone, or by irradiation with high energy ionizing radiation.

The free radicals produced in the reaction as a result of the degradation of peroxides or by irradiation treatment act as initiators for polymerization of the functional additives, as well as active sites for grafting when the free radicals are formed on the polymer backbones. For example, U.S. Pat. No. 5,411,994 discloses a method for making polyolefin graft copolymers by irradiating olefin polymer particles and then treating with a vinyl monomer in liquid form under a non-oxidizing environment which is maintained throughout the process. U.S. Pat. No. 5,817,707 discloses a process for making a graft copolymer by irradiating a porous propylene polymer material in the absence of oxygen, adding a controlled amount of oxygen to produce an oxidized propylene polymer material and then heating, dispersing the oxidized polymer in water in the presence of a surfactant to react with a vinyl monomer by a redox initiator system.

In all the above-mentioned documents, the grafting reaction is carried out on the polymer in solid state, at a temperature lower than the softening point of the polymer itself. Graft copolymers have also been made in an extruder as disclosed in U.S. Pat. No. 3,862,265 in which an organic peroxide initiator was injected into the extruder to initiate the grafting reaction of polyolefins in molten state with vinyl monomers. The reactive extrusion, carried out on the polymer in molten state, offers many advantages such as a fast reaction rate and a simple reaction system. Nevertheless, such graft polymerization requires the use of organic peroxides during extrusion. Since peroxides are unstable and explosive chemicals, they require special safe handling procedures to minimize the risk. Moreover, the degradation products from the organic peroxide, such as t-butyl alcohol, undesirably remain in the final product and render the product unsuitable for certain applications. In addition, since the free radical initiator used in such a process does not only initiate the graft copolymerization but also homopolymerization of the vinyl monomers, relatively low grafting efficiency often occurs and results in low degree of graft monomer content, thus reducing the value of the final products.

There is a need, therefore, for a process for making a graft copolymer with a low by-product concentration and a stable starting material, easy to handle and not requiring unusual safety procedures. Accordingly, it is an object of this invention to produce a graft copolymer material without using an organic peroxide during grafting in order to eliminate the above-mentioned difficulties associated with the handling of organic peroxides and to avoid the toxic by-products resulting from their use.

SUMMARY OF THE INVENTION

In accordance with the present invention, a stabilized polymeric material is made by using a reactive, peroxide-containing olefin polymer as an initiator.

In one embodiment, the present invention relates to a process for making a stabilized polymer concentrate comprising:
   a) preparing a polymer mixture comprising:
   I. about 30.0 to about 99.5 wt % of a reactive, peroxide-containing olefin polymer material (A);
   II. about 0.5 to about 50.0 wt % of at least one reducing agent capable of being reacted with or grafted onto the olefin polymer material (A) in the presence of free radicals; and
   III. about 0 to about 5.0 wt % of a grafting catalyst;
   b) extruding or reacting the polymer mixture at an elevated temperature, thereby producing a stabilized polymer concentrate; and optionally
   c) pelletizing the polymer concentrate, thereby producing a pelletized polymer concentrate.

Preferably, the polymer mixture comprises about 0.01 to about 5.0 wt % of a grafting catalyst and the elevated temperature is about 90 deg C. to about 200 deg C. Most preferably, the polymer mixture comprises about 0.05 to about 2.0 wt % of a grafting catalyst and the elevated temperature is from about 110 deg C. to about 180 deg C.

In another embodiment, the present invention relates to a process for making a stabilized polymer blend comprising:
   a) preparing a polymer mixture comprising:
   I. about 1.0 to about 20 wt % of a reactive, peroxide-containing olefin polymer material (A);
   II. about 0.1 to about 10.0 wt % of at least one reducing agent capable of being reacted with or grafted onto the olefin polymer material (A) in the presence of free radicals;
   III. about 10.0 to about 98.9 wt % of a polymer material (B); and
   IV. about 0 to about 5.0 wt % of a grafting catalyst; and
   b) extruding or reacting the polymer mixture at an elevated temperature, thereby producing a stabilized polymer blend; and optionally
   c) pelletizing the polymer blend, thereby producing a pelletized polymer blend.

Preferably, the polymer mixture comprises about 0.01 to about 5.0 wt % of a grafting catalyst and the elevated temperature is about 90 deg C. to about 200 deg C. Most preferably, the polymer mixture comprises about 0.05 to about 2.0 wt % of a grafting catalyst and the elevated temperature is from about 110 deg C. to about 180 deg C.

DETAILED DESCRIPTION OF THE INVENTION

The present invention relates to a process for making stabilized polymeric concentrates and polymeric blends. Olefin polymers suitable as a starting material for the reactive, peroxide-containing olefin polymer material (A) are a propylene polymer material, an ethylene polymer material, a butene-1 polymer material, or mixtures thereof. The olefin polymer used in the present invention can be selected from:

(a) a crystalline homopolymer of propylene having an isotactic index greater than about 80%, preferably about 90% to about 99.5%;

(b) a crystalline, random copolymer of propylene with an olefin selected from ethylene and $C_4$-$C_{10}$ α-olefins wherein the polymerized olefin content is about 1-10% by weight, preferably about 2% to about 8%, when ethylene is used, and about 1% to about 20% by weight, preferably about 2% to about 16%, when the $C_4$-$C_{10}$ α-olefin is used, the copolymer having an isotactic index greater than about 60%, preferably at least about 70%;

(c) a crystalline, random terpolymer of propylene and two olefins selected from ethylene and $C_4$-$C_8$ α-olefins wherein the polymerized olefin content is about 1% to about 5% by weight, preferably about 1% to about 4%, when ethylene is used, and about 1% to about 20% by weight, preferably about 1% to about 16%, when the $C_4$-$C_{10}$ α-olefins are used, the terpolymer having an isotactic index greater than about 85%; and (d) an olefin polymer composition comprising:

(i) about 10% to about 60% by weight, preferably about 15% to about 55%, of a crystalline propylene homopolymer having an isotactic index at least about 80%, preferably about 90 to about 99.5%, or a crystalline copolymer of monomers selected from (a) propylene and ethylene, (b) propylene, ethylene and a $C_4$-$C_8$ α-olefin, and (c) propylene and a $C_4$-$C_8$ α-olefin, the copolymer having a polymerized propylene content of more than about 85% by weight, preferably about 90% to about 99%, and an isotactic index greater than about 60%;

(ii) about 3% to about 25% by weight, preferably about 5% to about 20%, of a copolymer of ethylene and propylene or a $C_4$-$C_8$ α-olefin that is insoluble in xylene at ambient temperature; and (iii) about 10% to about 80% by weight, preferably about 15% to about 65%, of an elastomeric copolymer of monomers selected from (a) ethylene and propylene, (b) ethylene, propylene, and a $C_4$-$C_8$ α-olefin, and (c) ethylene and a $C_4$-$C_8$ α-olefin, the copolymer optionally containing about 0.5% to about 10% by weight of a polymerized diene and containing less than about 70% by weight, preferably about 10% to about 60%, most preferably about 12% to about 55%, of polymerized ethylene, and being soluble in xylene at ambient temperature and having an intrinsic viscosity of about 1.5 to about 6.0 dl/g;

wherein the total of (ii) and (iii), based on the total olefin polymer composition is about 50% to about 90% by weight, and the weight ratio of (ii)/(iii) is less than about 0.4, preferably 0.1 to 0.3, and the composition is prepared by polymerization in at least two stages;

(e) homopolymers of ethylene;

(f) random copolymers of ethylene and an α-olefin selected from $C_3$-$C_{10}$ α-olefins having a polymerized α-olefin content of about 1 to about 20% by weight, preferably about 2% to about 16%;

(g) random terpolymers of ethylene and two $C_3$-$C_{10}$ α-olefins having a polymerized α-olefin content of about 1% to about 20% by weight, preferably about 2% to about 16%;

(h) homopolymers of butene-1;

(i) copolymers or terpolymers of butene-1 with ethylene, propylene or $C_5$-$C_{10}$ α-olefin, the comonomer content ranging from about 1 mole % to about 15 mole %; and (j) mixtures thereof.

Preferably, the olefin polymer is selected from:

(a) a crystalline homopolymer of propylene having an isotactic index greater than about 80%, preferably about 90% to about 99.5%; and (b) a crystalline, random copolymer of propylene with an olefin selected from ethylene and $C_4$-$C_{10}$ α-olefins wherein the polymerized olefin content is about 1-10% by weight, preferably about 2% to about 8%, when ethylene is used, and about 1% to about 20% by weight, preferably about 2% to about 16%, when the $C_4$-$C_{10}$ α-olefin is used, the copolymer having an isotactic index greater than about 60%, preferably at least about 70%;

Most preferably, the olefin polymer is a propylene homopolymer having an isotactic index greater than about 90%.

The useful polybutene-1 homo or copolymers can be isotactic or syndiotactic and have a melt flow rate (MFR) from about 0.1 to 150 dg/min, preferably from about 0.3 to 100, and most preferably from about 0.5 to 75. These butene-1 polymer materials, their methods of preparation and their properties are known in the art. Suitable polybutene-1 polymers can be obtained, for example, by using Ziegler-Natta catalysts with butene-1, as described in WO 99/45043, or by metallocene polymerization of butene-1 as described in WO 02/102811, the disclosures of which are incorporated herein by reference.

Preferably, the butene-1 polymer materials contain up to about 15 mole % of copolymerized ethylene or propylene. More preferably, the butene-1 polymer material is a homopolymer having a crystallinity of at least about 30% by weight measured with wide-angle X-ray diffraction after 7 days, more preferably about 45% to about 70%, most preferably about 55% to about 60%.

The starting material for the reactive, peroxide-containing olefin polymer (A) and the polymer material (B) can be the same or different from each other.

The polymer material (B) used in the present invention can be selected from the olefin polymer or any type of polymer material that is suitable for melt processing at the extruder temperature, preferably at processing temperatures below 300.degree C.

In general the polymer material (B) is chosen according to the polymer matrix material that needs stabilization.

Besides the olefin polymer, a suitable polymer material (B) can be selected from copolymers of mono- and di-olefins with other vinyl monomers, for example, ethylene/alkyl acrylate copolymers, ethylene/alkyl methacrylate copolymers, ethylene/vinyl acetate copolymers, ethylene/acrylic acid copolymers and salts thereof (ionomers), and also mixtures thereof. It can also be selected from various polymers, for example polyamides. polystyrene, poly(p-methylstyrene), poly(α-methylstyrene), and other aromatic homopolymers and copolymers derived from vinyl-aromatic monomers, for example styrene, .alpha.-methylstyrene, all isomers of vinyltoluene, all isomers of ethylstyrene, propylstyrene, vinylbiphenyl, vinylnaphthalene, vinylanthracene and mixtures thereof. Also included are stereo block polymers. Copolymers including the already mentioned vinyl-aromatic monomers and comonomers selected from ethylene, propylene, dienes, nitriles, acids, maleic anhydrides, maleic acid amides, vinyl acetate, vinyl chloride and acrylic acid derivatives and mixtures thereof. For example styrene/butadiene, styrene/acrylo-nitrile, styrene/ethylene (interpolymers), styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene. Hydrogenated aromatic polymers prepared by hydrogenation of the polymers mentioned above, especially polycyclohexylethylene (PCHE), often also referred to as polyvinylcyclohexane (PVCH), which is prepared by hydrogenation of atactic polystyrene. Hydrogenated aromatic polymers prepared by hydrogenation of the polymers mentioned above. Graft copolymers of vinyl-aromatic monomers, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned above, such as those known, for example, as so-called ABS, MBS, ASA or AES polymers. Halogen-containing polymers, for example polychloroprene, chlorinated rubber, chlorinated and brominated copolymer of isobutylene/isoprene (halobutyl rubber), chlorinated or chlorosulphonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate. [0082]9. Polymers derived from .alpha.,.beta.-unsaturated acids and derivatives thereof, such as polyacrylates and polymethacrylates, or polymethyl methacrylates, polyacrylamides and polyacrylonitriles impact-resistant-modified with butyl acrylate. Copolymers of the monomers with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins. Homo- and co-polymers of cyclic ethers, such as polyalkylene glycols, polyethylene oxide, polypropylene oxide or copolymers thereof with bisglycidyl ethers. Polyacetals, such as polyoxymethylene, and also those polyoxymethylenes which contain comonomers, for example ethylene oxide; polyacetals modified with thermoplastic polyurethanes, acrylates or MBS. Polyphenylene oxides and sulphides and mixtures thereof with styrene polymers or polyamides. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamide 6/1 (poly-hexamethylene isophthalimide, MXD (m-xylylenediamine); polyamides prepared from hexamethylenediamine and iso- and/or terephthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems"). Examples of polyamides and copolyamides that can be used are derived from, inter alia, .epsilon.-caprolactam, adipic acid, sebacic acid, dodecanoic acid, isophthalic acid, terephthalic acid, hexamethylenediamine, tetramethylenediamine, 2-methyl-pentamethylenediamine, 2,2,4-trimethylhexamethylenediamine, 2,4,4-trimethylhexamethylenediamine, m-xylylenediamine or bis(3-methyl-4-aminocyclohexyl)methane; and also semi-aromatic polyamides such as polyamide 66/61, for example consisting of 70-95% polyamide 6/6 and 5-30% polyamide 6/1; and also tricopolymers in which some of the polyamide 6/6 has been replaced, for example consisting of 60-89% polyamide 6/6, 5-30% polyamide 6/1 and 1-10% of another aliphatic polyamide; the latter may consist of, for example, polyamide 6, polyamide 11, polyamide 12 or polyamide 6/12 units. Such tricopolymers may accordingly be designated polyamide 66/61/6, polyamide 66/61/11, polyamide 66/61/12, polyamide 66/61/610 or polyamide 66/61/612. Polyureas, polyimides, polyamide imides, polyether imides, polyester imides, polyhydantoins and polybenzimidazoles. Polyesters derived from dicarboxylic acids and dialcohols and/or from hydroxycarboxylic acids or the corresponding lactones, such as polyethylene terephthalate, polypropylene terephthalate, polybutylene terephthalate, poly-1,4-dimethylolcyclohexane terephthalate, polyalkylene naphthalate (PAN) and polyhydroxy-benzoates, and also block polyether esters derived from polyethers with hydroxyl terminal groups; and also polyesters modified with polycarbonates or MBS. Polycarbonates and polyester carbonates. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The reactive, peroxide-containing olefin polymer has a peroxide concentration typically ranging from about 10 to about 100 milli-equivalent per kilogram of the polymer (meq/kg), and preferably ranging from about 20 to about 50.

The reactive, peroxide-containing olefin polymer may be prepared by using a method described in WO 2005/116091 or WO 2005/063376, the content of which is incorporated herein by reference. Preferably, the reactive, peroxide-containing olefin polymer may be prepared via an irradiation and oxidation process by exposing the polyolefin starting material to high energy ionizing radiation in an essentially oxygen-free environment, i.e., an environment in which the active oxygen concentration is established and maintained at 0.004% by volume or less. The olefin polymer starting material is exposed to high-energy ionizing radiation under a blanket of inert gas, preferably nitrogen. The ionizing radiation should have sufficient energy to penetrate the mass of polymer material being irradiated to the extent desired. The ionizing radiation can be of any kind, but preferably includes electrons and gamma rays. More preferred are electrons beamed from an electron generator having an accelerating potential of 500-4,000 kilovolts. Satisfactory results are obtained at a dose of ionizing radiation of about 0.1 to about 15 megarads ("Mrad"), preferably about 0.5 to about 9.0 Mrad.

The term "rad" is usually defined as that quantity of ionizing radiation that results in the absorption of 100 ergs of energy per gram of irradiated material regardless of the source of the radiation using the process described in U.S. Pat. No. 5,047,446. Energy absorption from ionizing radiation is measured by the well-known convention dosimeter, a measuring device in which a strip of polymer film containing a radiation-sensitive dye is the energy absorption sensing means. Therefore, as used in this specification, the term "rad" means that quantity of ionizing radiation resulting in the absorption of the equivalent of 100 ergs of energy per gram of the polymer film of a dosimeter placed at the surface of the olefin material being irradiated, whether in the form of a bed or layer of particles, or a film, or a sheet.

The irradiated olefin polymer material is then oxidized in a series of steps. According to a preferred preparation method, the first treatment step consists of heating the irradiated polymer in the presence of a first controlled amount of active oxygen greater than 0.004% by volume but less than 21% by volume, preferably less than 15% by volume, more preferably less than 8% by volume, and most preferably from 0.5% to 5.0% by volume, to a first temperature of at least 25° C. but below the softening point of the polymer, preferably about 25° C. to 140° C., more preferably about 40° C. to 100° C., and most preferably about 50° C. to 90° C. Heating to the desired temperature is accomplished as quickly as possible, preferably in less than 10 minutes. The polymer is then held at the selected temperature, typically for about 5 to 90 minutes, to increase the extent of reaction of the oxygen with the free radicals in the polymer. The holding time, which can be determined by one skilled in the art, depends upon the properties of the starting material, the active oxygen concentration used, the irradiation dose, and the temperature. The maximum time is determined by the physical constraints of the fluid bed used to treat the polymer.

In the second treatment step, the irradiated polymer is heated in the presence of a second controlled amount of oxygen greater than 0.004% by volume but less than 21% by volume, preferably less than 15% by volume, more preferably less than 8% by volume, and most preferably from 0.5% to 5.0% by volume to a second temperature of at least 25° C. but below the softening point of the polymer. Preferably, the second temperature is from 80° C. to less than the softening point of the polymer, and greater than the temperature of the first treatment step. The polymer is then held at the selected temperature and oxygen concentration conditions for about 10 to 300 minutes, preferably about 20 to 180 minutes, most preferably about 30 to 60 minutes, to minimize the recombination of chain fragments, i.e., to minimize the formation of long chain branches. The holding time is determined by the same factors discussed in relation to the first treatment step.

In the optional third step, the oxidized olefin polymer material is heated under a blanket of inert gas, preferably nitrogen, to a third temperature of at least 80° C. but below the softening point of the polymer, and held at that temperature for about 10 to about 120 minutes, preferably about 60 minutes. A more stable product is produced if this step is carried out. It is preferred to use this step if the reactive, peroxide-containing olefin polymer material is going to be stored rather than used immediately, or if the radiation dose that is used is on the high end of the range described above. The polymer is then cooled to a fourth temperature of about below 50° C. under a blanket of inert gas, preferably nitrogen, before being discharged from the bed. In this manner, stable intermediates are formed that can be stored at room temperature for long periods of time without further degradation.

As used in this specification, the expression "room temperature" or "ambient" temperature means approximately 25° C. The expression "active oxygen" means oxygen in a form that will react with the irradiated olefin polymer material. It includes molecular oxygen, which is the form of oxygen normally found in air. The active oxygen content requirement of this invention can be achieved by replacing part or all of the air in the environment by an inert gas such as, for example, nitrogen.

It is preferred to carry out the treatment by passing the irradiated polymer through a fluid bed assembly operating at a first temperature in the presence of a first controlled amount oxygen, passing the polymer through a second fluid bed assembly operating at a second temperature in the presence of a second controlled amount of oxygen, and then maintaining the polymer at a third temperature under a blanket of nitrogen, in a third fluid bed assembly. In commercial operation, a continuous process using separate fluid beds for the first two steps, and a purged, mixed bed for the third step is preferred. However, the process can also be carried out in a batch mode in one fluid bed, using a fluidizing gas stream heated to the desired temperature for each treatment step. Unlike some techniques, such as melt extrusion methods, the fluidized bed method does not require the conversion of the irradiated polymer into the molten state and subsequent re-solidification and comminution into the desired form. The fluidizing medium can be, for example, nitrogen or any other gas that is inert with respect to the free radicals present, e.g., argon, krypton, and helium.

The grafting catalyst comprises transition metal compound, preferably, transition metal oxides.

The reducing agent of the present invention comprises various amine compounds, especially, hydroxylamines and their derivatives. Examples of the reducing agent include 3-amino-4-hydroxydiphenyl, 3-alkylamino-4-hydroxydiphenyls, 4-amino-3-hydroxydiphenyl, 4-alkylamino-3-hydroxydiphenyls, 2-amino-3-hydroxydiphenyl, 2-alkylamino-3-hydroxydiphenyls, 3-amino-2-hydroxydiphenyl, 3-alkylamino-2-hydroxydiphenyls, 3-amino-4-hydroxydiphenyl ether, 3-alkylamino-4-hydroxydiphenyl ethers, 4-amino-3-hydroxydiphenyl ether, 4-alkylamino-3-hydroxydiphenyl ethers, 2-amino-3-hydroxydiphenyl ether, 2-alkylamino-3-hydroxydiphenyl ethers, 3-amino-2-hydroxydiphenyl ether, 3-alkylamino-2-hydroxydiphenyl ethers, 3-amino-4-hydroxydiphenyl amine, 3-alkylamino-4-hydroxydiphenyl amines, 4-amino-3-hydroxydiphenylamine, 4-alkylamino-3-hydroxydiphenyl amines, 2-amino-3-hydroxydiphenylamine, 2-alkylamino-3-hydroxydiphenyl amines, 3-amino-2-hydroxydiphenylamine, 3-alkylamino-2-hydroxydiphenyl amines, 3-amino-4-hydroxydiphenyl sulfone, 3-alkylamino-4-hydroxydiphenyl sulfones, 4-amino-3-hydroxydiphenyl sulfone, 4-alkylamino-3-hydroxydiphenyl sulfones, 2-amino-3-hydroxydiphenyl sulfone, 2-alkylamino-3-hydroxydiphenyl sulfones, 3-amino-2-hydroxydiphenyl sulfone, 3-alkylamino-2-hydroxydiphenyl sulfones, 3-amino-4-hydroxydiphenyl methane, 3-alkylamino-4-hydroxydiphenyl methanes, 4-amino-3-hydroxydiphenyl methane, 4-alkylamino-3-hydroxydiphenyl methanes, 2-amino-3-hydroxydiphenyl methane, 2-alkylamino-3-hydroxydiphenyl methanes, 3-amino-2-hydroxydiphenyl methane, 3-alkylamino-2-hydroxydiphenyl methanes, 2-phenyl-2-(3-amino-4-hydroxyphenyl)propane, 2-phenyl-2-(3-alkylamino-4-hydroxyphenyl)propanes, 2-phenyl-2-(4-amino-3-hydroxyphenyl)propane, 2-phenyl-2-(4-alkylamino-3-hydroxyphenyl)propanes, 2-phenyl-2-(2-amino-3-hydroxyphenyl)propane, 2-phenyl-2-(2-alkylamino-3-hydroxyphenyl)propanes, 2-phenyl-2-(3-amino-2-hydroxyphenyl)propane and 2-phenyl-2-(3-alkylamino-2-hydroxyphenyl)propanes, 3-amino-3',4-dihydroxydiphenyl, 3-alkylamino-3',4-dihydroxydiphenyls, 3-amino-4,4'-dihydroxydiphenyl, 3-alkylamino-4,4'-dihydroxydiphenyls, 4-amino-3,3'-dihydroxydiphenyl, 4-alkylamino-3,3'-dihydroxydiphenyls, 4-amino-3,4'-dihydroxydiphenyl, 4-alkylamino-3,4'-dihydroxydiphenyls, 3-amino-3,4'-dihydroxydiphenyl ether, 3-alkylamino-3,4'-dihydroxydiphenyl ethers, 3-amino-4,4'-dihydroxydiphenyl ether, 3-alkylamino-4,4'-dihydroxydiphenyl ethers, 4-amino-3,3'-dihydroxydiphenyl ether, 4-alkylamino-3,3'-dihydroxydiphenyl ethers, 4-amino-3,4'-dihydroxydiphenyl ether, 4-alkylamino-3,4'-dihydroxydiphenyl ethers, 3-amino-3',4-dihydroxydiphenyl amine, 3-alkylamino-3',4-dihydroxydiphenyl amines, 3-amino-4,4'-dihydroxydiphenyl amine, 3-alkylamino-4,4'-dihydroxydiphenyl amines, 4-amino-3,3'-dihydroxydiphenyl amine, 4-alkylamino-3,3'-dihydroxydiphenyl amines, 4-amino-3,4'-dihydroxydiphenyl amine, 4-alkylamino-3,4'-dihydroxydiphenyl amines, 3-amino-3',4-dihydroxydiphenyl sulfone, 3-alkylamino-3',4-dihydroxydiphenyl sulfones, 3-amino-4,4'-dihydroxydiphenyl sulfone, 3-alkylamino-4,4'-dihydroxydiphenyl sulfones, 4-amino-3,3'-dihydroxydiphenyl sulfone, 4-alkylamino-3,3'-dihydroxydiphenyl sulfones, 4-amino-3,4'-dihydroxydiphenyl sulfone, 4-alkylamino-3,4'-dihydroxydiphenyl sulfones, 3-amino-3',4-dihydroxydiphenyl methane, 3-alkylamino-3',4-dihydroxydiphenyl methanes, 3-amino-4,4'-dihydroxydiphenyl methane, 3-alkylamino-4,4'-dihydroxydiphenyl methanes, 4-amino-3,3'-dihydroxydiphenyl methane, 4-alkylamino-3,3'-dihydroxydiphenyl methanes, 4-amino-3,4'-dihydroxydiphenyl methane, 4-alkylamino-3,4'-dihydroxydiphenyl methanes, 2-(3-amino-4-hydroxyphenyl)-2-(3'-hydroxyphenyl)propane, 2-(3-alkylamino-4-hydroxyphenyl)-2-(3'-hydroxyphenyl)propanes, 2-(3-amino-4-hydroxyphenyl)-2-(4'-hydroxyphenyl)propane, 2-(3-alkylamino-4-hydroxyphenyl)-2-(4'-hydroxyphenyl)propanes, 2-(4-amino-3-hydroxyphenyl)-2-(3'-hydroxyphenyl)propane, 2-(4-alkylamino-3-hydroxyphenyl)-2-(3'-hydroxyphenyl)propanes, 2-(4-amino-3-hydroxyphenyl)-2-(4'-hydroxyphenyl)propane and 2-(4-alkylamino-3-hydroxyphenyl)-2-(4'-hydroxyphenyl)propanes, 3,3'-diamino-4-hydroxydiphenyl, 3,3'-di(alkylamino)-4-hydroxydiphenyls, 3,4'-diamino-4-hydroxydiphenyl, 3,4'-di(alkylamino)-4-hydroxydiphenyls, 3',4-diamino-3-hydroxydiphenyl, 3',4-di(alkylamino)-3-hydroxydiphenyls, 4,4'-diamino-3-hydroxydiphenyl, 4,4'-di(alkylamino)-3-hydroxydiphenyls, 3,3'-diamino-4-hydroxydiphenyl ether, 3,3'-di(alkylamino)-4-hydroxydiphenyl ethers, 3,4'-diamino-4-hydroxydiphenyl ether, 3,4'-di(alkylamino)-4-hydroxydiphenyl ethers, 3',4-diamino-3-hydroxydiphenyl ether, 3',4-di(alkylamino)-3-hydroxydiphenyl ethers, 4,4'-diamino-3-hydroxydiphenyl ether, 4,4'-di(alkylamino)-3-hydroxydiphenyl ethers, 3,3'-diamino-4-hydroxydiphenyl amine, 3,3'-di(alkylamino)-4-hydroxydiphenyl amines, 3,4'-diamino-4-hydroxydiphenyl amine, 3,4'-di(alkylamino)-4-hydroxydiphenyl amines, 3',4-diamino-3-hydroxydiphenyl amine, 3',4-di(alkylamino)-3-hydroxydiphenyl amines, 4,4'-diamino-3-hydroxydiphenyl amine, 4,4'-di(alkylamino)-3-hydroxydiphenyl amines, 3,3'-di-amino-4-hydroxydiphenyl sulfone, 3,3'-di(alkylamino)-4-hydroxydiphenyl sulfones, 3,4'-diamino-4-hydroxydiphenyl sulfone, 3,4'-di(alkylamino)-4-hydroxydiphenyl sulfones, 3',4-diamino-3-hydroxydiphenyl sulfone, 3',4-di(alkylamino)-3-hydroxydiphenyl sulfones, 4,4'-diamino-3-hydroxydiphenyl sulfone, 4,4'-di(alkylamino)-3-hydroxydiphenyl sulfones, 3,3'-diamino-4-hydroxydiphenyl methane, 3,3'-di(alkylamino)-4-hydroxydiphenyl methanes, 3,4'-diamino-4-hydroxydiphenyl methane, 3,4'-di(alkylamino)-4-hydroxydiphenyl methanes, 3',4-diamino-3-hydroxydiphenyl methane, 3',4-di(alkylamino)-3-hydroxydiphenyl methanes, 4,4'-diamino-3-hydroxydiphenyl methane, 4,4'-di(alkylamino)-3-hydroxydiphenyl methanes, 2-(3'-aminophenyl)-2-(3-amino-4-hydroxyphenyl)propane, 2-(3'-alkylaminophenyl)-2-(3-alkylamino-4-hydroxyphenyl)propanes, 2-(4'-aminophenyl)-2-(3-amino-4-hydroxyphenyl)propane, 2-(4'-alkylaminophenyl)-2-(3-alkylamino-4-hydroxyphenyl)propanes, 2-(3'-aminophenyl)-2-(4-amino-3-hydroxyphenyl)propane, 2-(3'-alkylaminophenyl)-2-(4-alkylamino-3-hydroxyphenyl)propanes, 2-(4'-aminophenyl)-2-(4-amino-3-hydroxyphenyl)propane and 2-(4'-alkylaminophenyl)-2-(4-alkylamino-3-hydroxyphenyl)propanes, 3,3'-diamino-4,4'-dihydroxydiphenyl, 3,3'-di(alkylamino)-4,4'-dihydroxydiphenyls, 4,4'-diamino-3,3'-dihydroxydiphenyl, 4,4'-di(alkylamino)-3,3'-dihydroxydiphenyls, 2,2'-diamino-3,3'-dihydroxydiphenyl, 2,2'-di(alkylamino)-3,3'-dihydroxydiphenyls, 3,3'-diamino-2,2'-dihydroxydiphenyl, 3,3'-di(alkylamino)-2,2'-dihydroxydiphenyls, 3,3'-diamino-4,4'-dihydroxydiphenyl ether, 3,3'-di(alkylamino)-4,4'-dihydroxydiphenyl ethers, 4,4'-diamino-3,3'-dihydroxydiphenyl ether, 4,4'-di(alkylamino)-3,3'-dihydroxydiphenyl ethers, 2,2'-diamino-3,3'-dihydroxydiphenyl ether, 2,2'-di(alkylamino)-3,3'-dihydroxydiphenyl ethers, 3,3'-diamino-2,2'-dihydroxydiphenyl ether, 3,3'-di(alkylamino)-2,2'-dihydroxydiphenyl ethers, 3,3'-diamino-4,4'-dihydroxydiphenyl amine, 3,3'-di(alkylamino)-4,4'-dihydroxydiphenyl amines, 4,4'-diamino-3,3'-dihydroxydiphenyl amine, 4,4'-di(alkylamino)-3,3'-dihydroxydiphenyl amines, 2,2'-diamino-3,3'-dihydroxydiphenyl amine, 2,2'-di(alkylamino)-3,3'-dihydroxydiphenyl amines, 3,3'-diamino-2,2'-dihydroxydiphenyl amine, 3,3'-di(alkylamino)-2,2'-dihydroxydiphenyl amines, 3,3'-diamino-4,4'-dihydroxydiphenyl methane, 3,3'-di(alkylamino)-4,4'-dihydroxydiphenyl methanes, 4,4'-diamino-3,3'-dihydroxydiphenyl methane, 4,4'-di(alkylamino)-3,3'-dihydroxydiphenyl methanes, 2,2'-diamino-3,3'-dihydroxydiphenyl methane, 2,2'-di(alkylamino)-3,3'-dihydroxydiphenyl methanes, 3,3'-diamino-2,2'-dihydroxydiphenyl methane, 3,3'-di(alkylamino)-2,2'-dihydroxydiphenyl methanes, 2,2-bis(3-amino-4-hydroxyphenyl)propane, 2,2-bis[3-(alkylamino)-4-hydroxyphenyl]propanes, 2,2-bis(4-amino-3-hydroxyphenyl)propane, 2,2-bis[4-(alkylamino)-3-hydroxyphenyl]propanes, 2,2-bis(2-amino-3-hydroxyphenyl)propane, 2,2-bis[2-(alkylamino)-3-hydroxyphenyl]propanes, 2,2-bis(3-amino-2-hydroxyphenyl)propane and 2,2-bis[3-(alkylamino)-2-hydroxyphenyl]propanes, di-(2,2,6,6-tetramethylpiperidin-4-yl) adipate, di-(2,2,6,6-tetramethylpiperidin-4-yl) sebacate di-(2,2,6,6-tetramethylpiperidin-4-yl) phthalate, alpha,alpha'-(di-2,2,6,6-tetramethylpiperidine-4-oxy)-p-xylene, di-(2,2,6,6-tetramethylpiperidin-4-yl) succinate, di-(2,2,6,6-tetramethylpiperidin-4-yl) malonate, di-(1-oxyl-2,2,6,6-tetramethylpiperidin-4-yl) isophthalate, 1-oxyl-2,2,6,6-tetramethylpiperidin-4-yl), 4-hydroxy-1-methoxy-2,2,6,6- tetramethylpiperidine, di-(1-hydroxy-2,2,6,6-tetramethylpiperidin-4-yloxy)-p-xylene, 1-ethoxy-4-hydroxy-2,2,6,6-tetramethylpiperidine, (2,2,6,6-tetramethylpiperidin-4-yl)-[4-(2-oxoazepin-1-yl)-2,2,6,6-tetramethylpiperidin-4-yl]acetate, 3,3'-diamino-4,4'-dihydroxydiphenyl sulfone, 3,3'-di(alkylamino)-4,4'-dihydroxydiphenyl sulfones, 4,4'-diamino-3,3'-dihydroxydiphenyl sulfone, 4,4'-di(alkylamino)-3,3'-dihydroxydiphenyl sulfones, 2,2'-diamino-3,3'-dihydroxydiphenyl sulfone, 2,2'-di(alkylamino)-3,3'-dihydroxydiphenyl sulfones, 3,3'-diamino-2,2'-dihydroxydiphenyl sulfone, 3,3'-di(alkylamino)-2,2'-dihydroxydiphenyl sulfones. Preferably, the reducing agent contains only saturated aliphatic carbon single bonds or aromatic bonds. More preferably, the reducing agent comprises cyclic or aromatic hydroxylamines and their derivatives. Most preferably, the reducing agent comprises hindered amines.

Other than in the operating examples, or where otherwise indicated, all numbers, values and/or expressions referring to quantities of ingredients, reaction conditions, etc., used in the specification and claims are to be understood as modified in all instances by the term "about."

The following examples illustrate the present invention. Unless otherwise indicated in the following examples and elsewhere in the specification and claims, all parts and percentages are by weight, all temperatures are in degrees Celsius, and pressure is at or near atmospheric pressure.

Example 1

100 g of reactive, peroxide containing olefin polymer made by Basell USA Inc. using the procedure published as preparation 1 in WO 2004/113406, 20 g of Decanedioic acid, bis(2,2,6,6-tetramethyl-4-piperidinyl) ester and 0.5 g of $MoO_3$, both commercially available, were mixed in a plastic bag. The mixed content was then transferred to a one liter autoclave equipped with a helix stirrer. The autoclave was heated with heating oil to 120 deg C. and then kept at 120 deg C. for three hours. The autoclave was then heated with heating oil to 170 deg C. and then kept at 170 deg C. with the vent open. After at the temperature of 170 deg C. for three hours, the molten reactant was poured on the surface of a stainless steel table to form a plastic sheet. The plastic sheet was cut into small pieces (E-1 pellets) by using a cutter manually.

Sample E-1 was made by mixing E-1 pellets with a propylene polymer and ammonium polyphosphate, and then extruded in a 20 mm twin screw extruder under the following conditions:

Formulation: 2 wt % of E-1 pellets, 0.3 wt % of IRGANOX® B 225, 0.5 wt % of zinc stearate, 25 wt % of ammonium polyphosphate and the balance is propylene homopolymer with a MFR of 6.7 dg/min. Except E-1 pellets, the other ingredients were commercially available.

Temperature profile: zone 1: 160 deg C., zone 2: 185 deg C., zone 3: 190 deg C., zone 4: 190 deg C.; zone 5: 190 deg C., extruder head: 185 deg C.

Control Sample C-1 was made by using C-1 pellets which were prepared by using propylene homopolymer with a MFR of 6.7 dg/min in place of the reactive, peroxide containing olefin polymer.

Both Sample E-1 and control Sample C-1 were used to make 3 mm think plaques by compression molding and the stability of the formulation were evaluated by the flammability of the plaques by subjecting the plaques in a flame for 10 seconds in a vertical position.

TABLE I

Flammability of Plastic Plaques

| Sample No. | after $1^{st}$ flame (second) | after $2^{nd}$ flame (second) |
|---|---|---|
| C-1 | Burned completely | n/a |
| E-1 | 0 | 2 |

Example 2

Synthesis of allyl substituted 2,2,6,6-teramethyl-piperidin-4-ol (P-2)

Into a 1000 ml four-necked flask were added 250 ml of allyl chloride and 100 g of 2,2,6,6-teramethyl-piperidin-4-ol, both commercially available, the contents of the flask were brought to a temperature of 40 deg C. under agitation for 10 hours. Thereafter, the temperature is raised to the flux temperature with a condenser to remove the un-reacted allyl chloride. Thereafter, the obtained solution was washed with 10 wt % sodium hydroxide solution and then concentrated by an evaporator.

100 g of reactive, peroxide containing olefin polymer made by Basell USA Inc. using the procedure published as preparation 1 in WO 2004/113406, and 20 g of P-2 were mixed in a plastic bag. The mixed content was then transferred to a one liter autoclave equipped with a helix stirrer. The autoclave was heated with heating oil to 120 deg C. and then kept at 120 deg C. for three hours. The autoclave was then heated with heating oil to 170 deg C. with the vent open. After at the temperature of 170 deg C. for three hours, the molten reactant was poured on the surface of a stainless steel table to form a plastic sheet. The plastic sheet was cut into small pieces (E-2 pellets) by using a cutter manually.

Sample E-2 was made by mixing E-2 pellets with a propylene polymer, and then extruded in a 20 mm twin screw extruder under the following conditions: Formulation: 2 wt % of E-2 pellets, 0.3 wt % of IRGANOX® B 225, 0.5 wt % of zinc stearate and the balance is propylene homopolymer with a MFR of 6.7 dg/min. Except E-2 pellets, the other ingredients were commercially available.

Temperature profile: zone 1: 160 deg C., zone 2: 185 deg C., zone 3: 190 deg C., zone 4: 190 deg C.; zone 5: 190 deg C., extruder head: 185 deg C.

Control Sample C-2 was made by using C-2 pellets prepared by using propylene homopolymer with a MFR of 6.7 dg/min in place of the reactive, peroxide containing olefin polymer.

Both Sample E-2 and control Sample C-2 were used to make 0.5 mm thick films by compression molding and the stability of the formulation were evaluated by placing the films in a fluorescent sunlight/black light chamber. The time needed to increase the carbonyl absorbance to 0.5 by FTIR on the exposed films is defined as stability time (hour).

TABLE II

Stability Time of Plastic Films

| Sample No. | Stability Time (hour) |
|---|---|
| C-2 | 480 |
| E-2 | 980 |

What is claimed is:
1. A process for making a stabilized polymer concentrate comprising:

a) preparing a polymer mixture comprising:
I. about 30.0 to about 99.0 wt % of a reactive, peroxide-containing olefin polymer material (A);
wherein the reactive, peroxide-containing olefin polymer material (A) was prepared from an olefin polymer starting material selected from:
(a) a crystalline homopolymer of propylene having an isotactic index greater than about 80%;
(b) a crystalline, random copolymer of propylene with an olefin selected from ethylene and C4-C10 α-olefins wherein the polymerized olefin content is about 1-10% by weight, when ethylene is used, and about 1% to about 20% by weight, when the C4-C10 α-olefin is used, the copolymer having an isotactic index greater than about 60%,
(c) a crystalline, random terpolymer of propylene and two olefins selected from ethylene and C4-C8 α-olefins wherein the polymerized olefin content is about 1% to about 5% by weight, when ethylene is used, and about 1% to about 20% by weight, when the C4-C10 α-olefins are used, the terpolymer having an isotactic index greater than about 85%; and
(d) an olefin polymer composition comprising:
(i) about 10% to about 60% by weight, of a crystalline propylene homopolymer having an isotactic index at least about 80%, or a crystalline copolymer of monomers selected from (a) propylene and ethylene, (b) propylene, ethylene and a C4-C8 α-olefin, and (c) propylene and a C4-C8 α-olefin, the copolymer having a polymerized propylene content of more than about 85% by weight, and an isotactic index greater than about 60%;
(ii) about 3% to about 25% by weight of a copolymer of ethylene and propylene or a C4-C8 α-olefin that is insoluble in xylene at ambient temperature; and
(iii) about 10% to about 80% by weight of an elastomeric copolymer of monomers selected from (a) ethylene and propylene, (b) ethylene, propylene, and a C4-C8 α-olefin, and (c) ethylene and a C4-C8 α-olefin, the copolymer optionally containing about 0.5% to about 10% by weight of a polymerized diene and containing less than about 70% by weight of polymerized ethylene, and being soluble in xylene at ambient temperature and having an intrinsic viscosity of about 1.5 to about 6.0 dl/g;
wherein the total of (ii) and (iii), based on the total olefin polymer composition is about 50% to about 90% by weight, and the weight ratio of (ii)/(iii) is less than about 0.4, and the composition is prepared by polymerization in at least two stages;
(e) a homopolymer of propylene having solubility in xylene at room temperature higher than about 20% by weight;
(f) homopolymers of ethylene;
(g) random copolymers of ethylene and an α-olefin selected from C3-C10 α-olefins having a polymerized α-olefin content of about 1 to about 20% by weight,
(h) random terpolymers of ethylene and two C3-C10 α-olefins having a polymerized α-olefin content of about 1% to about 20% by weight,
(i) homopolymers of butene-1;
(j) copolymers or terpolymers of butene-1 with ethylene, propylene or C5-C10 α-olefin, the comonomer content ranging from about 1 mole % to about 15 mole %; and
(k) mixtures thereof;
II. about 0.5 to about 50.0 wt % of at least one reducing agent capable of being reacted with or grafted onto the olefin polymer material (A) in the presence of free radicals, wherein the reducing agent is selected from a hydroxylamine compound; and
III. about 0.01 to about 5.0 wt % of a grafting catalyst;
b) extruding or reacting the polymer mixture at a temperature from about 90 deg C to about 200 deg C, thereby producing a stabilized polymer concentrate.

2. The process according to claim 1 wherein the hydroxylamine compound is bis(2,2,6,6-tetramethyl-4-piperidinyl) ester.

3. The process according to claim 1 wherein the hydroxylamine compound is bis(2,2,6,6-tetramethyl-4-piperidin-4-ol.

4. The process according to claim 1 wherein the grafting catalyst is selected from transition metal compounds.

5. The process according to claim 1 wherein the grafting catalyst is selected from transition metal oxides.

* * * * *